(12) United States Patent
Mikami et al.

(10) Patent No.: US 7,021,613 B2
(45) Date of Patent: Apr. 4, 2006

(54) ANTIVIBRATION DEVICE

(75) Inventors: Masafumi Mikami, Saitama (JP); Katsutaka Momose, Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 10/374,041

(22) Filed: Feb. 27, 2003

(65) Prior Publication Data

US 2003/0218287 A1 Nov. 27, 2003

(30) Foreign Application Priority Data

May 2, 2002 (JP) .............................. 2002-131038
May 23, 2002 (JP) .............................. 2002-149656

(51) Int. Cl.
*B60G 11/22* (2006.01)

(52) U.S. Cl. .................................. 267/293; 267/140.12

(58) Field of Classification Search ................ 267/293, 267/220, 141, 141.1, 141.2, 141.3, 140.13, 267/140.5, 294

See application file for complete search history.

(56) References Cited

U.S. PATENT DOCUMENTS

| | | | | |
|---|---|---|---|---|
| 2,908,341 A | * | 10/1959 | Nallinger et al. | ........... 267/293 |
| 4,258,820 A | * | 3/1981 | Miura et al. | ................. 267/293 |
| 5,551,675 A | * | 9/1996 | Simuttis et al. | ............. 267/293 |
| 6,374,935 B1 | * | 4/2002 | Kirschenmann et al. | . 180/89.12 |
| 6,398,200 B1 | * | 6/2002 | Kakimoto et al. | ..... 267/140.12 |
| 6,502,883 B1 | * | 1/2003 | Rice | ........................... 267/220 |
| 6,698,733 B1 | * | 3/2004 | Larmande | ................... 267/293 |

FOREIGN PATENT DOCUMENTS

JP 11-201209 A 7/1999

* cited by examiner

*Primary Examiner*—Melanie Torres
(74) *Attorney, Agent, or Firm*—Birch, Stewart, Kolasch & Birch, LLP

(57) ABSTRACT

A toe correction bushing (1) is composed of a main body (2) and a stopper member (3), wherein the main body (2) is integrally provided with an inner cylinder (4), an outer cylinder (5), and an elastic body (6). The outer cylinder (5) is provided at part of the axial end with an outwardly opening inclined section (7). A recessed space (8) is provided inside of the inclined section (7). The stopper member (3) is provided with a circular plate section (20) and a stopper projection (23) at the peripheral section thereof. A boss (21) provided at the central section of the stopper member (3) is press-fitted into one end of the inner cylinder (4) for integration and at the same time, the stopper projection (23) is caused to engage the recessed space (8). When a lateral force F to the right is applied to the outer cylinder (5), the axial movement of the outer cylinder (5) is controlled by the stopper projection (23) and displaced in the direction perpendicular to the axis by an inclined plane (24) for toe correction. It is possible to change characteristics of the toe correction by changing the material, shape or the like of the stopper projection (23).

15 Claims, 15 Drawing Sheets

ANTIVIBRATION DEVICE

BACKGROUND OF THE INVENTION

1. Field of the Invention

The present invention relates to an antivibration device suitable for a toe correction bushing and the like for use in, for example, a suspension of a car.

2. Description of the Prior Art

A toe correction bushing is known. For example, Japanese Unexamined Patent Publication No. HEI 11-201209 (1999) discloses the toe correction bushing comprising an inner cylinder, an outer cylinder disposed outside the inner cylinder for engagement, an elastic body provided between the two cylinders, and a circular plate-shaped stopper member welded to the axial end of the inner cylinder, wherein the stopper member is provided at part of its outer periphery with an inclined plane, and the outer cylinder is provided at part of its one end with an inclined plane facing the inclined plane of the stopper member. In this case, when the outer cylinder is moved in the axial direction toward the stopper member by lateral force, the axial movement of the outer cylinder is controlled by the inclined planes of the stopper member and the outer cylinder to cause it to be displaced in the direction perpendicular to the axis.

An antivibration device such as the toe correction bushing is displaced in the direction perpendicular to the axis by the input of a lateral force in the axial direction. Accordingly, it is necessary to provide a displacement controlling means comprising a stopper means, an inclined member provided inside the elastic body or the like and it is required for the displacement controlling means to effectively carry out the displacement in a direction perpendicular to the axis. Moreover, it is required to easily control the displacement characteristics in the direction perpendicular to the axis in accordance with the purpose of use. It is therefore an object of the present invention to realize these requirements.

The stopper member of the above-mentioned embodiment is made of a plate-shaped member welded to an axial end of the inner cylinder and integrated with the outer cylinder by the elastic body which is injected between the inclined plane of the outer cylinder and the inner cylinder. In this case, the inner cylinder is first integrated with the stopper member before injection of the elastic body and then, the outer cylinder is integrated with these by injection of the elastic body. Accordingly, even though it is required to change characteristics of the stopper member in accordance with the purpose of use so as to change the characteristics of toe correction, such a change is difficult. It is therefore another object of the present invention to easily carry out the change of a stopper member.

The conventional toe correction bushing described above is displaced in the direction perpendicular to the axis by the input of a lateral force in the axial direction. Accordingly, it is necessary to provide a recess or the like to reduce the spring constant of the elastic body, thereby making the displacement easy. However, in this case, since the amount of displacement in the axial direction is increased relative to the lateral force, the amount of displacement in the direction perpendicular to the axis is relatively decreased. On the other hand, if the spring constant of the elastic body is increased, it affects the riding quality. This means that there is an upper limit on the spring constant itself of the elastic body. Accordingly, it is required to have a construction with directional properties so that the spring constant of the elastic body itself is not so increased, but the spring constant can be increased only in the case of toe correction. It is therefore the other object of the present invention to realize these requirements.

According to the invention of claim 1, an antivibration device is provided, which comprises an inner cylinder, an outer cylinder disposed outside the inner cylinder for engagement, an elastic body provided between the two cylinders, and a stopper member adapted to control the axial movement of one of the two cylinders when receiving external force and to displace it in the direction perpendicular to the axis, characterized in that the stopper member is separately provided from the two cylinders and the elastic body, and secured to the axial end of the inner cylinder.

According to the invention of claim 2, the outer cylinder is provided at part of its axial end with an outwardly opening inclined section, and the stopper member is provided with a stopper projection adapted to engage the inner space of the inclined section.

According to the invention of claim 3, an antivibration device is provided, which comprises an inner cylinder, an outer cylinder disposed outside the inner cylinder for engagement, an elastic body provided between the inner and outer cylinders, and a displacement control means for displacing an input to the direction perpendicular to the axis when one of the two cylinders receives the input in the axial direction, characterized in that an intermediate ring is integrally embedded in the elastic body between the two cylinders and is provided with an inward projecting section, which projects to the inner cylinder side, for serving as the displacement control means, and that a recessed section is provided at a position of the elastic body opposite to the intermediate ring relative to the axis in a cross-section of the inner cylinder in the axial direction.

According to the invention of claim 4 according to claim 1, the antivibration device is characterized in that the inward projecting section is integrally formed with the intermediate ring, or is formed as a separate body to be mounted on the intermediate ring for integration.

According to the invention of claim 5 according to claim 3 or claim 4, the antivibration device is characterized in that the inner cylinder is provided, in the axial direction, with an outward projecting section facing and with some distance from the inward projecting section and part of the elastic body is disposed between the inward projecting section and the outward projecting section.

According to the invention of claim 6 according to one of claims 3 through 5, the antivibration device is characterized in that the inward projecting section and the recessed section, or these and the outward projecting section are provided right and left to be symmetrical in a cross-section of the inner cylinder in the axial direction with respect to a point on the axis.

According to the invention of claim 1, the stopper member is separately provided from the inner and outer cylinders and the elastic body. Accordingly, it is possible to easily obtain necessary characteristics only by selecting the most suitable stopper member corresponding to the purpose of use relative to a main body consisting of the two cylinders and the elastic body which are integrated in advance and by installing the stopper member at the axial end of the inner cylinder.

According to the invention of claim 2, the stopper member is provided with a stopper projection. The stopper projection is inserted into a space inside of the inclined section provided at the axial end of the outer cylinder and caused to face the inclined section. By the input of external force, the inclined section contacts the stopper projection to compress it. As a result, by the counterforce of the stopper projection, the inner and outer cylinders are caused to be relatively displaced in the direction perpendicular to the axis. In this manner, it is possible to easily change the characteristics only by changing the material or shape of the stopper projection.

According to the invention of claim 3, the intermediate ring is provided with the inward projecting section, and the elastic body is provided with the recessed section which is located on the opposite side relative to the inner cylinder. Accordingly, when an input in the axial direction is applied, the inward projecting section compresses the elastic body to generate a force in the direction perpendicular to the axis, wherein the recessed section accelerates the displacement by this force in the direction perpendicular to the axis. In this manner, by providing the intermediate ring, the spring constant of the elastic body itself is not so increased, but the spring constant in the case of displacement in the axial direction can be increased thanks to the existence of the intermediate ring. This means that the directional properties can be applied to the spring constant and a sufficient amount of displacement in the direction perpendicular to the axis can be realized for the input in the axial direction. Further, it is not only possible to simplify the shape of the outer cylinder, but also to make the outer shape of the entire device compact.

According to the invention of claim 4, the inward projecting section can be integrally formed by forming part of the intermediate ring, or can be formed as a separate body to be mounted on the intermediate ring for integration. Thus, it is possible to easily realize the inward projecting section.

According to the invention of claim 5, the inner cylinder is provided with an outward projecting section facing and with some distance from the inward projecting section in the axial direction of the inner cylinder, and part of the elastic body is disposed between the inward projecting section and the outward projecting section. In this manner, the elastic body is compressed between the inward projecting section of the intermediate ring and the outward projecting section of the inner cylinder by the input in the axial direction. As a result, a large force in the direction perpendicular to the axis can be generated by the counterforce of the elastic body to increase the amount of displacement in the direction perpendicular to the axis.

According to the invention of claim 6, the inward projecting section and the recessed section, or these and the outward projecting section are provided right and left to be symmetrical in a cross-section of the inner cylinder in the axial direction with respect to a point on the axis. In this manner, since a symmetrical construction is realized in the axial direction, even when the antivibration devices according to the present invention are provided in pairs on the right and left side of a body, these can be used in common by reversing the device right and left.

DETAILED DESCRIPTION OF THE PREFERRED EMBODIMENTS

Figure 1:
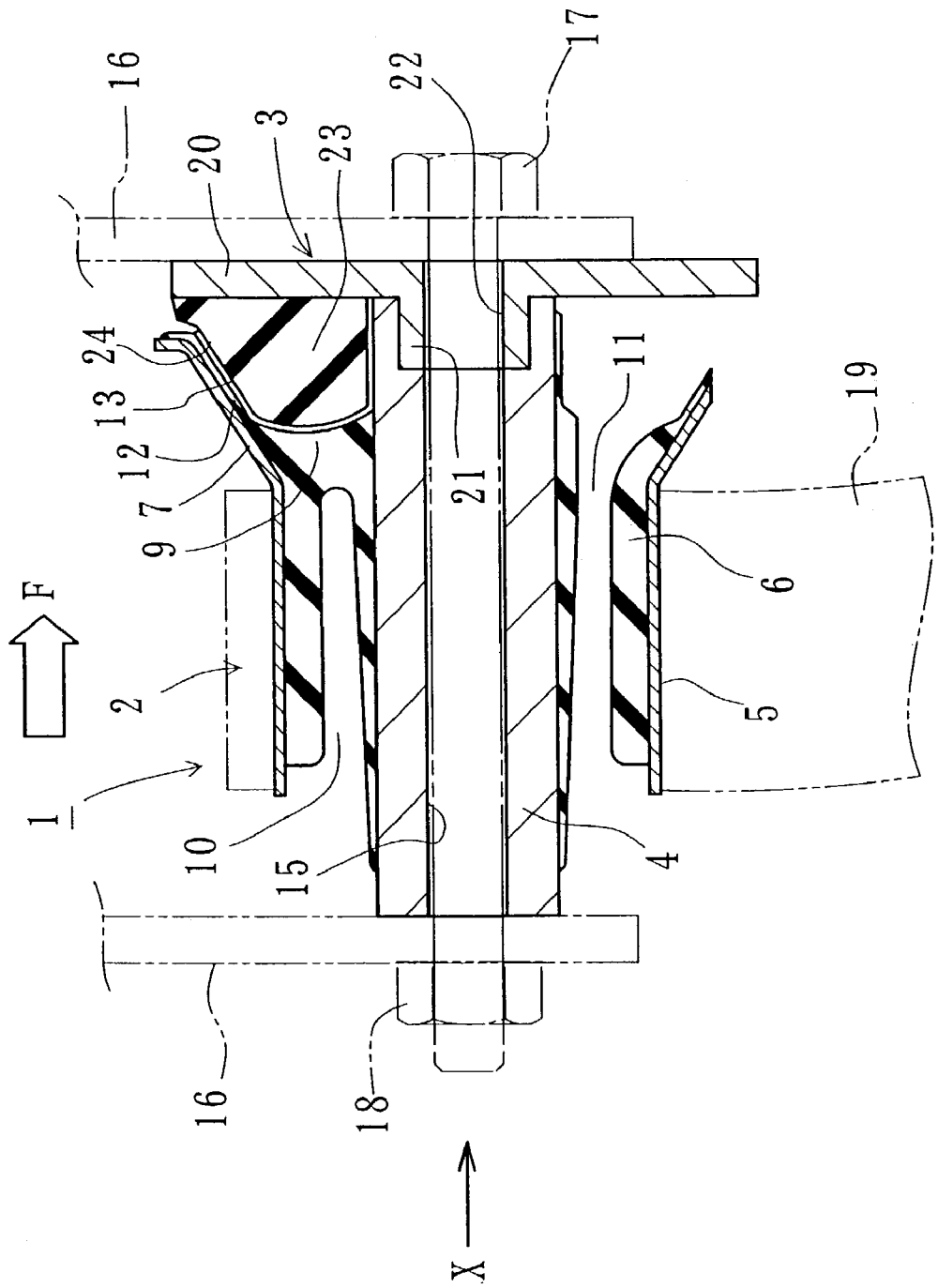
FIG. 1 is an axially cross-sectional view of a toe correction bushing for use in a car according to the present embodiment.
Figure 2:
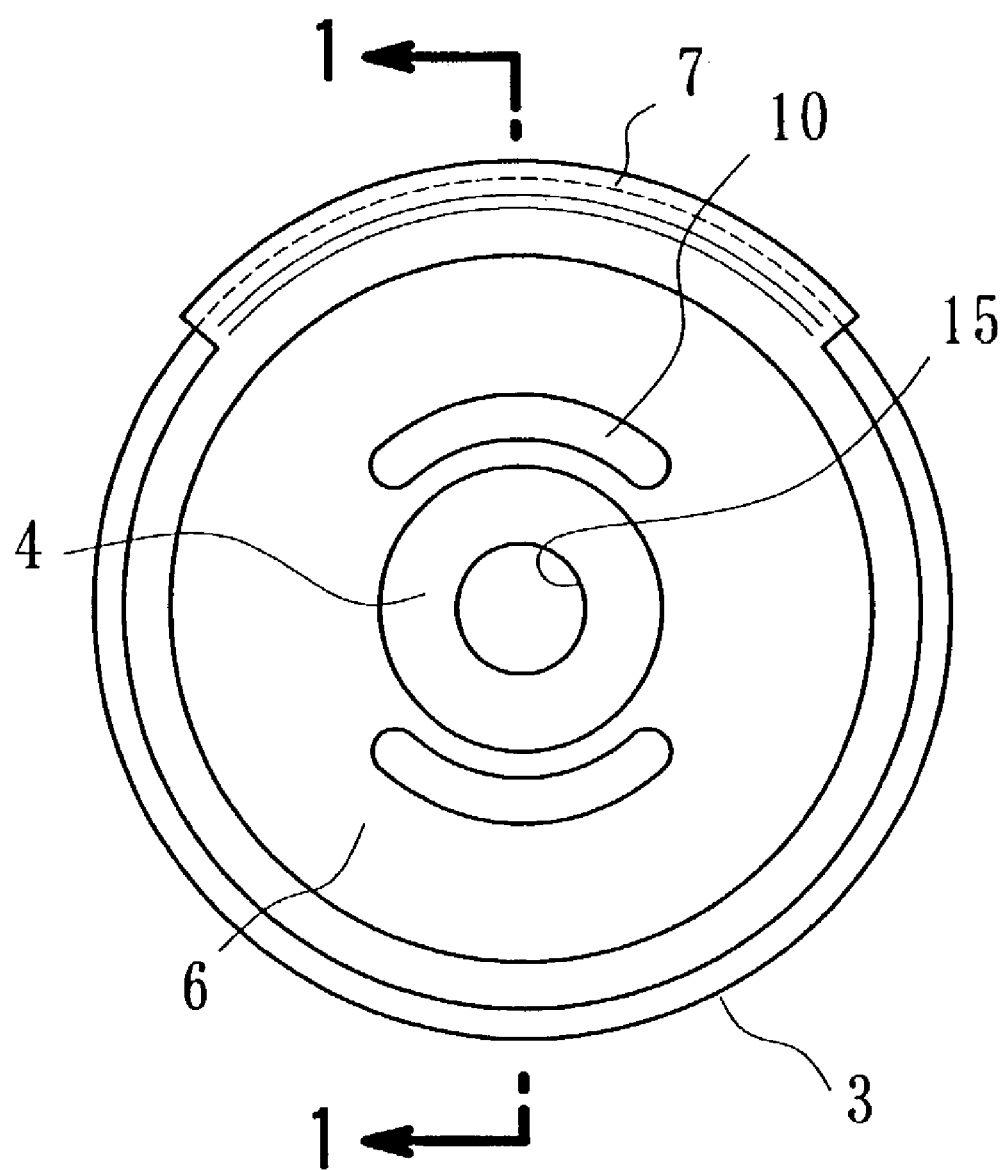
FIG. 2 is a view showing a stopper member from the direction of arrow X of FIG. 1.
Figure 3:
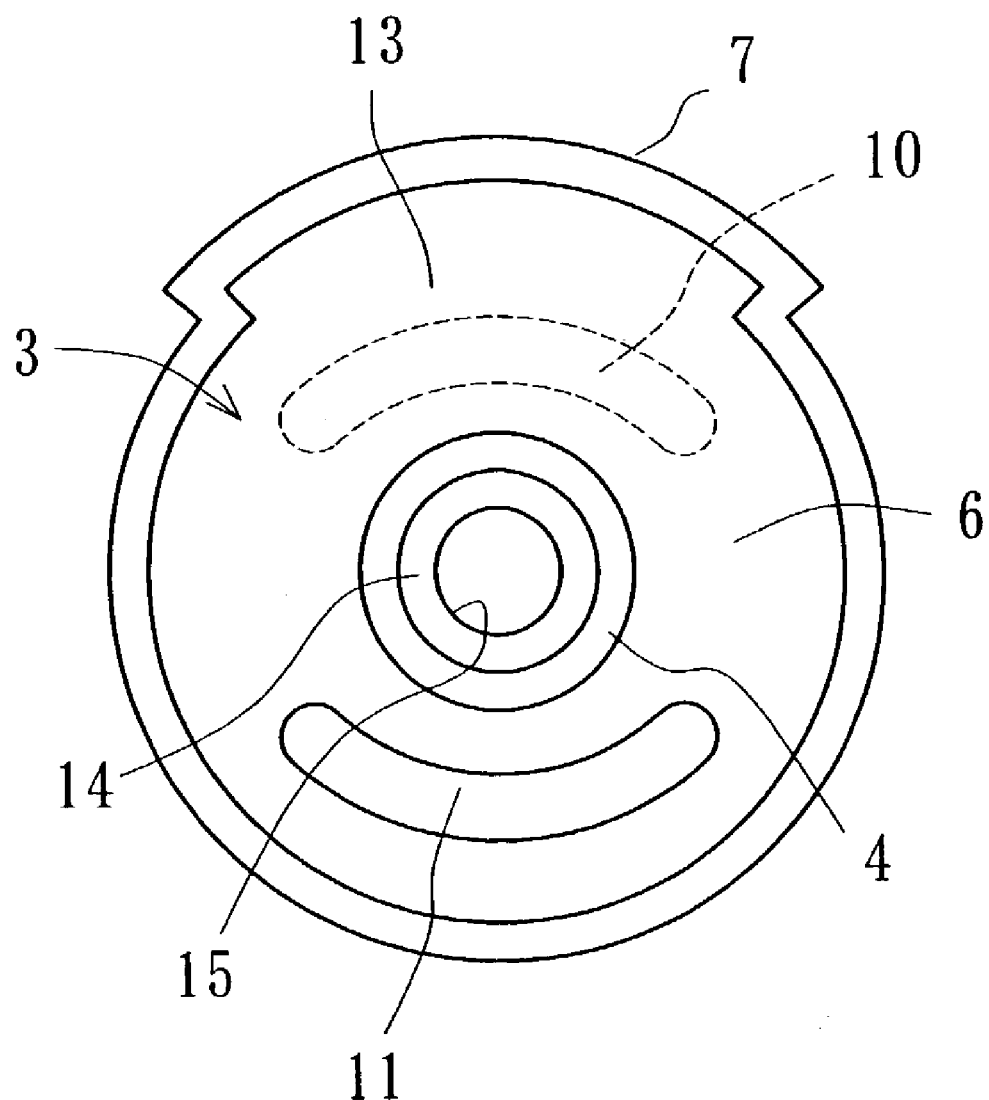
FIG. 3 is a view showing the stopper member from the opposite side of FIG. 2.
Figure 4:
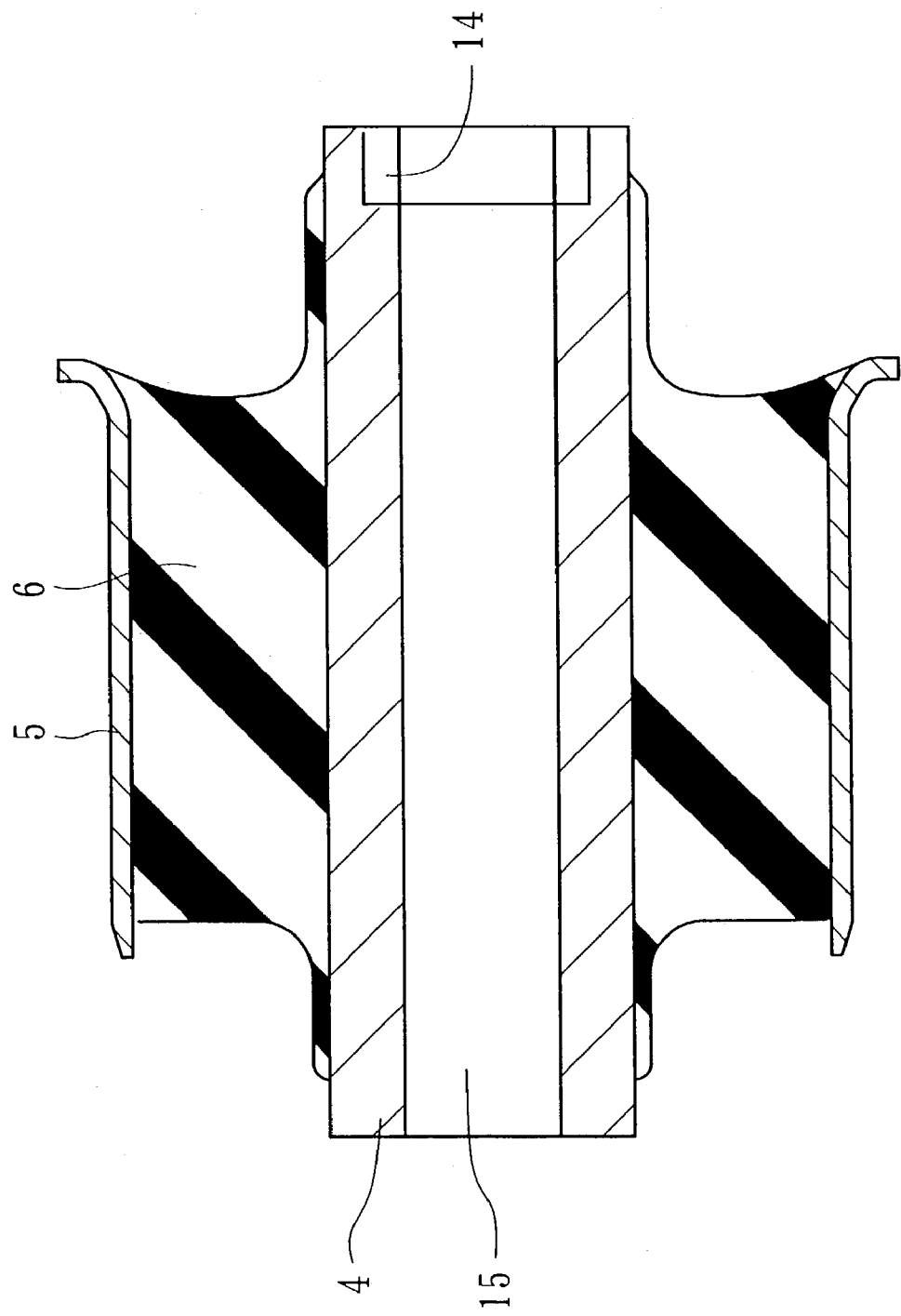
FIG. 4 is a cross-sectional view of a main body taken along the line 4—4 of FIG. 5.
Figure 5:
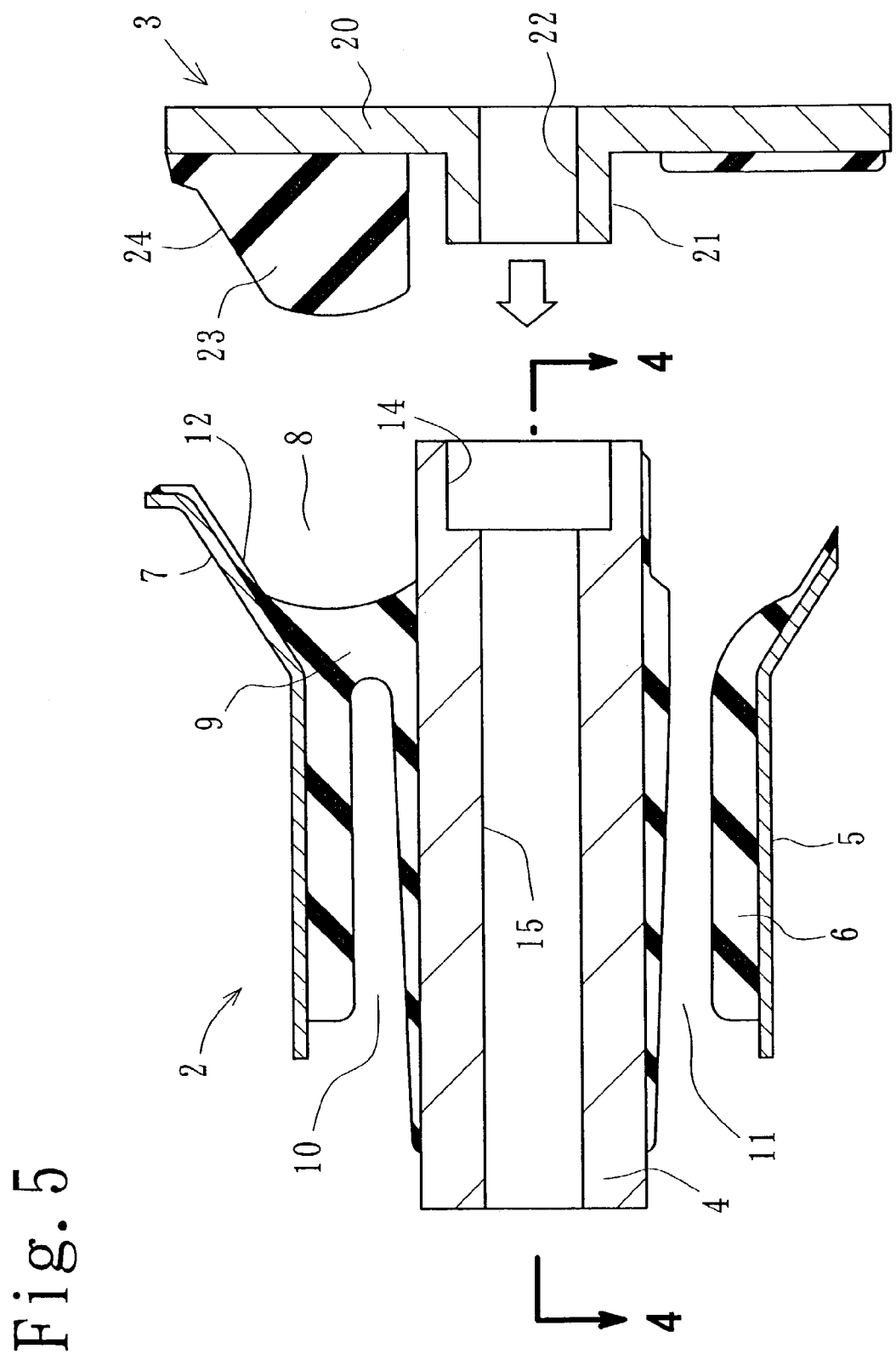
FIG. 5 is a view showing the installation of the main body on the stopper member.
Figure 6:
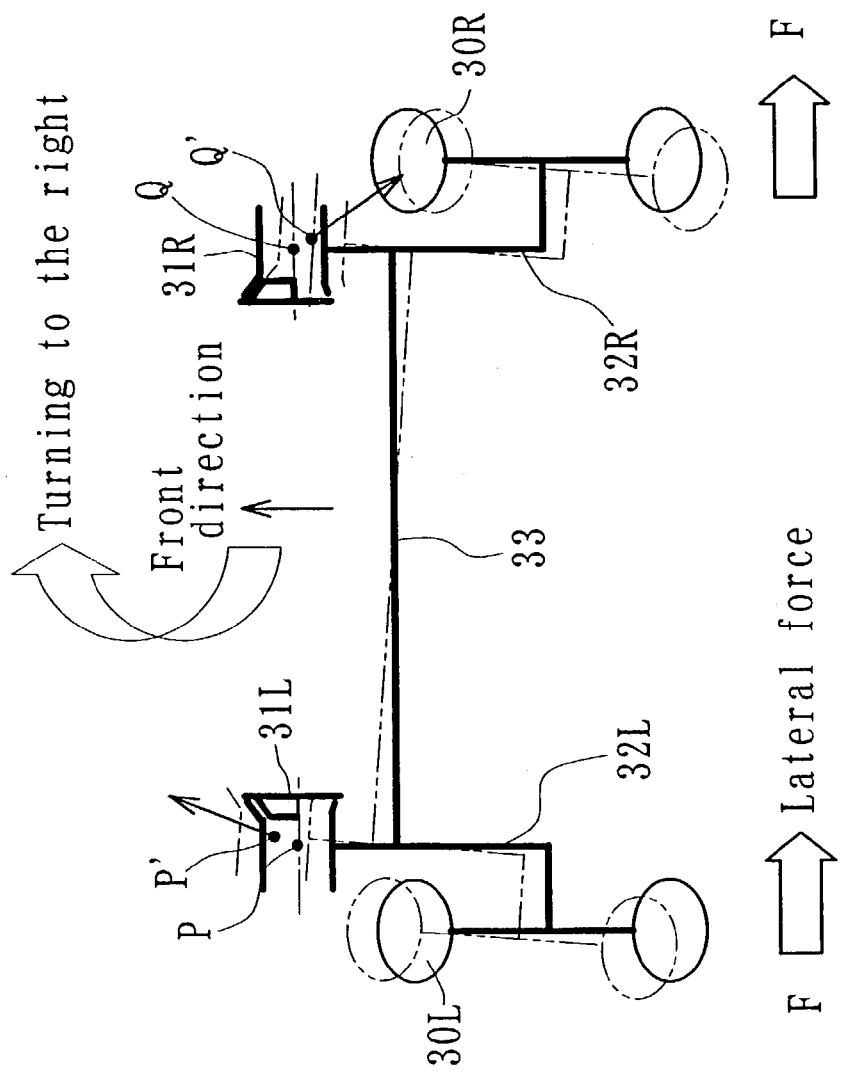
FIG. 6 is a view showing a principle of toe correction.

A first embodiment of the present invention will be described with reference to the accompanying drawings. FIG. 1 is an axially cross-sectional view (i.e., the cross-sectional view taken along the line 1—1 of FIG. 2) of a toe correction bushing for use in a car according to the present embodiment. FIG. 2 is a view showing a stopper member from the direction of the arrow X of FIG. 1. FIG. 3 is view showing the same member from the opposite side of FIG. 2. FIG. 4 is a cross-sectional view taken along the line 4—4 of FIG. 5. FIG. 5 is a view showing the installation of the main body on the stopper member. FIG. 6 is a view theoretically showing the action of the present invention.

In these figures, a toe correction bushing 1 is composed of a main body 2 and a stopper member 3. The main body 2 is provided with an inner cylinder 4, an outer cylinder 5, and an elastic body 6 provided between the two cylinders for mutual integration.

The inner and outer cylinders 4, 5 are concentrically disposed cylindrical members made of metal or the like and adapted to engage one another. Part of the axial end of the outer cylinder 5 facing the stopper member 3 is provided with an outwardly opening inclined section 7. Provided inside of the inclined section 7 is a recessed space 8 which opens to expand toward the stopper member 3 (see FIG. 5).

The elastic body 6 is made of a suitable elastic material such as a rubber. In this case, the rubber is injected between the inner and outer cylinders 4, 5. The two cylinders 4, 5 are integrated by vulcanizing jointing and part of the inclined section 7 on the base side is also integrated with the inner cylinder 4 to form a connecting section 9.

In the upper half of FIGS. 1 to 3, a recess 10 is formed parallel to part of the outer cylinder 5 excluding the inclined section 7. The recess 10 is provided to be open on the left side and to reach near to the connecting section 9. In the lower half thereof, a through-hole 11 is provided to pass through the elastic body 6 parallel to the axis.

In the direction perpendicular to FIG. 1 around the axis, as is apparent from FIG. 4, the recess and the through-hole are not provided. Further, as shown in FIG. 1, there is also provided on the inner surface of the inclined section 7 an inclined section elastic layer 12 integrally and continuously formed with the elastic body 6. This inclined section elastic layer 12 continues from a curved surface section surrounding the recessed space 8. The curved surface section is a wall of the connecting section 9 facing the recessed space 8.

As shown in FIG. 1, the stopper member 3 is provided with a circular plate section 20 made of metal or other rigid material which has a substantially circular shape as seen from the axis of the inner cylinder 4. Provided on the central section of the stopper member 3 is a boss 21 with a through-hole 22 formed. A stopper projection 23 made of a suitable material such as a rubber is integrally formed with the stopper member 3 on the same side as the boss 21 and in a position corresponding to the inclined section 7 on the outer periphery of the elastic body 6 when installed. The stopper projection 23 is provided to project in the axial direction.

The projection amount of the stopper projection 23 is designed to have a shape so as to cause the entire section thereof to engage the recessed space 8 when installed on the main body 2 and to circumferentially provide some clearance 13 relative to the inner cylinder 4, the inclined section elastic layer 12 of the inclined section 7, and the connecting section 9. The stopper projection 23 is provided at the outer periphery with an inclined surface 24 which is substantially parallel to the inclined section elastic layer 12 of the inclined section 7.

The material, physical properties (such as elastic modulus), thickness, angle of slope of the inclined surface 24 and the like of the stopper projection 23 can be selectively set depending on the purpose of use of the toe correction bushing 1. For example, if the axial amount of displacement of the outer cylinder 5 relative to the inner cylinder 4 is required to be small, the stopper projection 23 can be made soft to reduce the spring constant, or the angle of slope of the inclined surface 24 can be gentle. On the contrary, if the amount of displacement in the direction perpendicular to the axis is required to be large, the stopper projection 23 can be made hard to increase the spring constant or the slope angle of the inclined surface 24 can be acute and the clearance from the inclined section 7 etc. can be small. In this manner, adjustment can be easily made.

The stopper member 3 is integrated with the main body 2 by press-fitting the boss 21 (see FIG. 1) into a press-fitting section 14 (see FIGS. 3 and 4) formed in one end of the inner cylinder 4. However, a suitable securing means such as welding is available. The through-hole 22 of the stopper member 3 is coaxially provided with and has the same diameter as an axial hole 15 formed through the axial center section of the inner cylinder 4.

The toe correction bushing 1 is inserted between U-shaped brackets 16 provided on the car body side, and the inner cylinder 4 thereof is connected to the body by inserting a bolt 17 into the axial hole 15 and the through-hole 22 and fastening it with a nut 18. The outer cylinder 5 is also secured to one end of a suspension arm 19 by press-fitting or the like.

An operation of the present embodiment will now be explained. FIG. 6 shows a principle of the toe correction in the present invention. This mechanism is constructed in such a manner that a pair of right wheels 30R and left wheels 30L are connected to a car body via right and left toe correction bushings 31R and 31L, and right and left suspension arms 32R and 32L. The right and left suspension arms 32R and 32L are connected by a cross member 33.

In the present figure, the mechanism shown in FIG. 1 is used on the left side of the body. Namely, the toe correction bushing 1 in FIG. 1 corresponds to the left toe correction bushing 31L in the present figure, and the suspension arm 19 corresponds to the left suspension arm 32L in the present figure, respectively. These are symmetrically used on the right side of the body. Namely, the right toe correction bushing 31R is used by reversing the toe correction bushing 1 shown in FIG. 1 right and left.

In this suspension mechanism, for example, when turned to the right, the left toe correction bushing 31L affected by the lateral force F displaces a bearing point P of the left suspension arm 32L to P' toward the front and inner direction of the body, thereby tilting the left wheel 30L, which becomes the outer wheel, to the right. As a result, the right suspension arm 32R integrally connected by the left suspension arm 32L and the cross bar 33 also tilts to the right, displacing a bearing point Q to Q' toward the rear and inner direction of the body to have a toe-in tendency.

In this case, the lateral force F which is the external force to the right is applied from the wheel side to the outer cylinder 5 as shown in FIG. 1. As a result, the outer cylinder 5 moves toward the stopper member 3 while deforming the elastic body 6, but the inclined section 7 contacts and compresses the stopper projection 23. The axial movement of the outer cylinder 5 is controlled by the counterforce of the stopper projection 23 in this case and, is displaced in the direction perpendicular to the axis.

More specifically, the inclined section 7 of the outer cylinder 5 is pushed out toward the front and inner direction by the inclined surface 24 to move the outer cylinder 5 in the direction perpendicular to the axis, that is, the direction perpendicular to the axis of the inner cylinder 4. In this manner, as shown in FIG. 6, the suspension arm 32L on the left side of the body tilts to the right of the body. Accordingly, the suspension arm 32R integrally connected by the cross member 33 on the right side of the body tilts to the right of the body. As a result, as shown in FIG. 6, a toe correction motion which causes the right and left wheels 30L and 30R to toe-in is performed in such a manner that each tilts to the turning center side. When turned to the left, the above-mentioned operation is reversed.

It is possible to freely change characteristics of this toe correction motion by changing the stopper projection 23. Namely, by preparing in advance a plurality of stopper members 3 to which the stopper projections 23 with different characteristics are installed, it is possible to easily obtain the toe correction bushing 1 provided with necessary characteristics only by installing the stopper member 3 corresponding to the toe correction motion required for each purpose of use. The main body 2 can be used in common.

It is to be noted that the embodiments can be varied or applied in various manners. For example, the inclined section 7 is not always required. It is also possible to connect the inner cylinder 4 to the suspension arm 19 so that the outer cylinder 5 can be secured to the body side.

Figure 7:
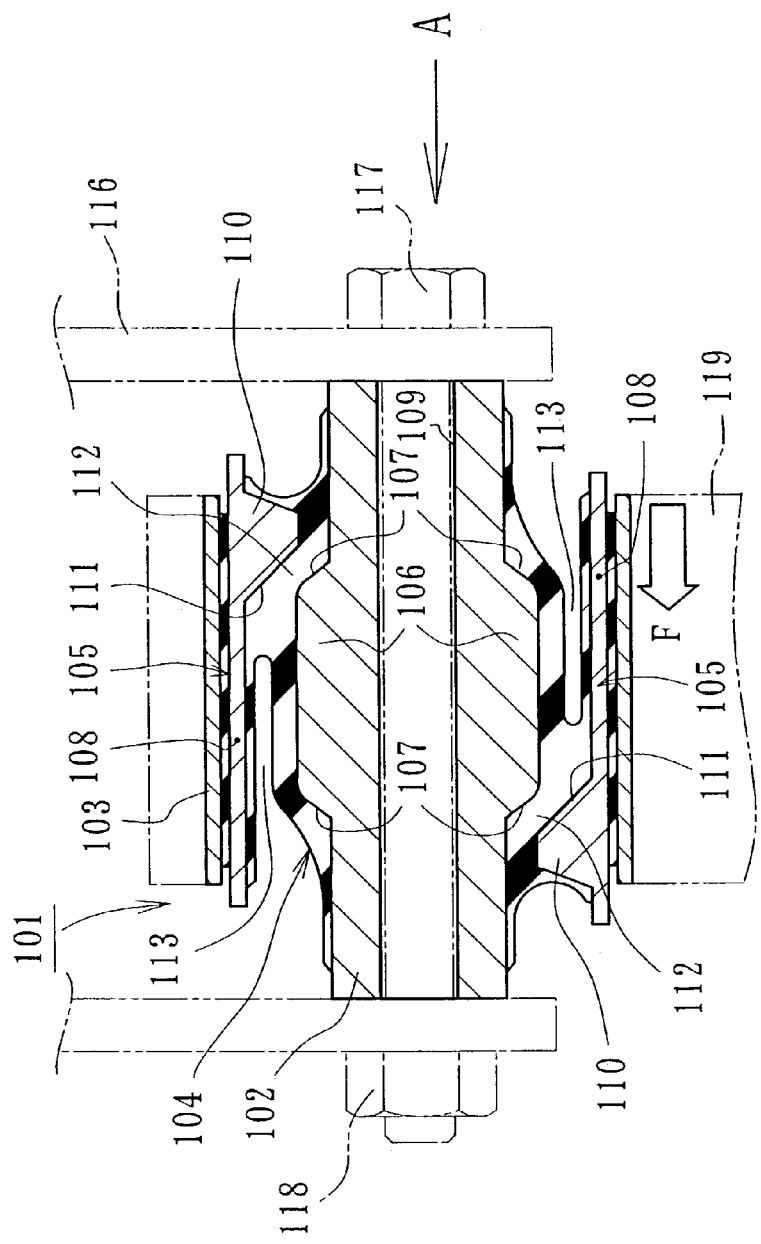
FIG. 7 is a cross-sectional view of a toe correction bushing according to a first embodiment taken along the line 7—7 of FIG. 8.
Figure 8:
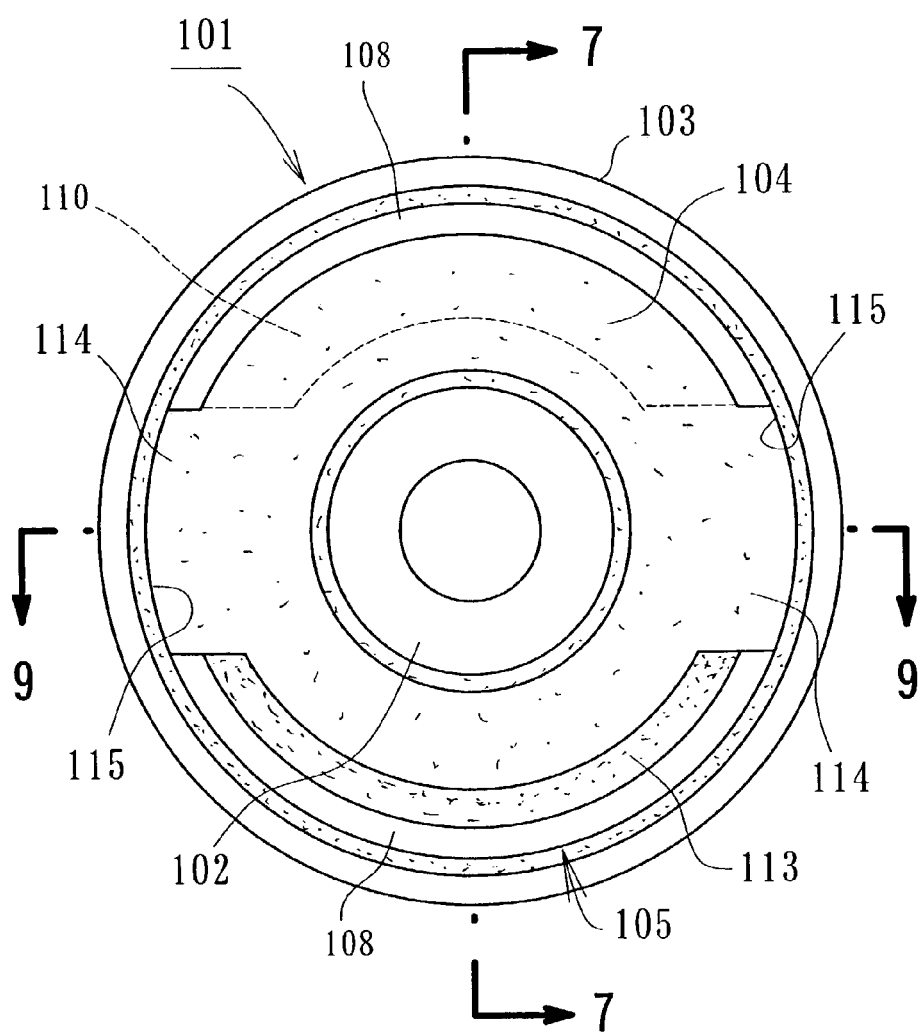
FIG. 8 is a view of the toe correction bushing as seen from the arrow B of FIG. 7.
Figure 9:
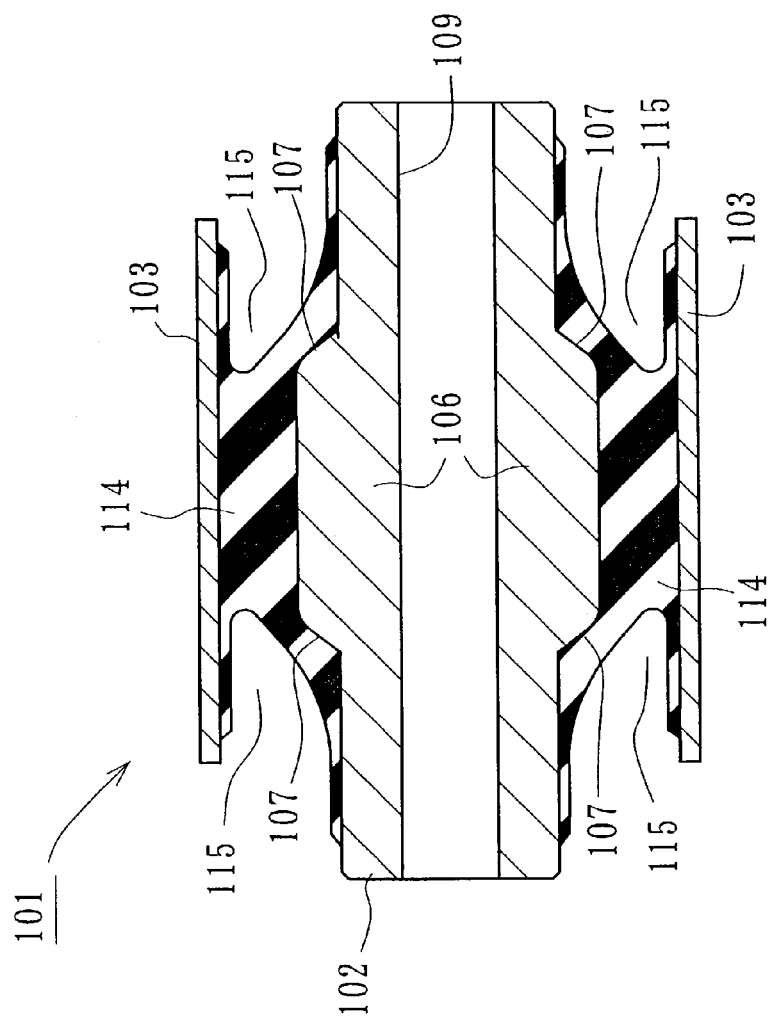
FIG. 9 is a view of the toe correction bushing taken along the line 9—9 of FIG. 8.
Figure 10:
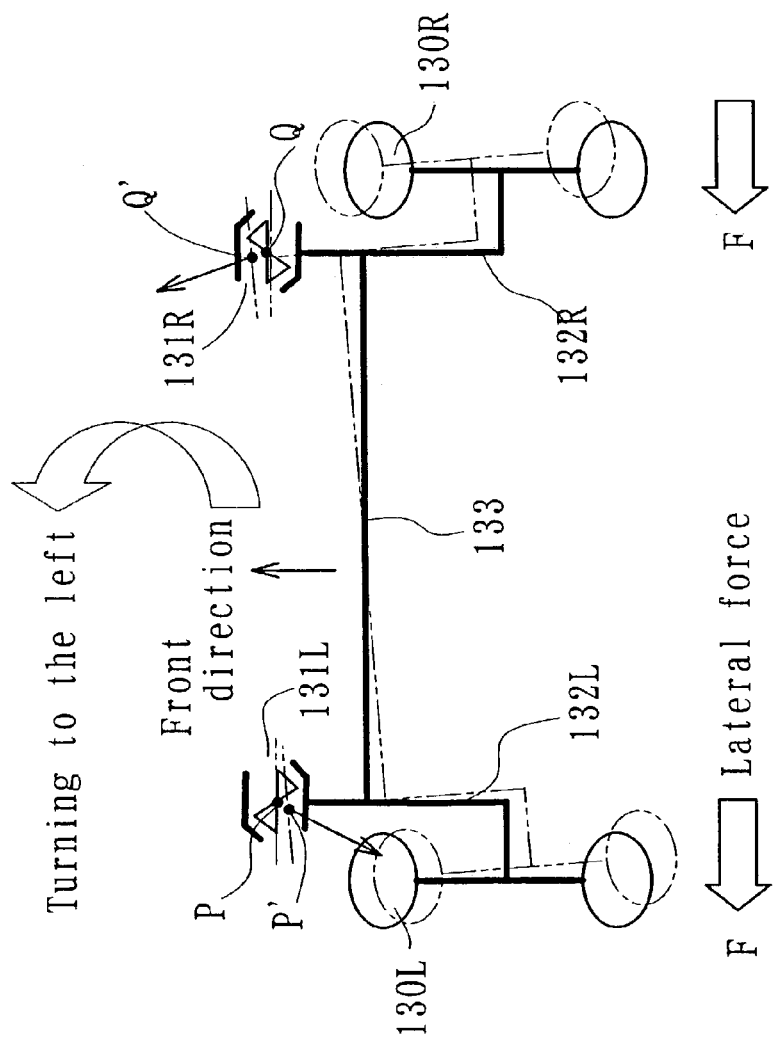
FIG. 10 is a view showing a theoretical action of toe correction.
Figure 11:
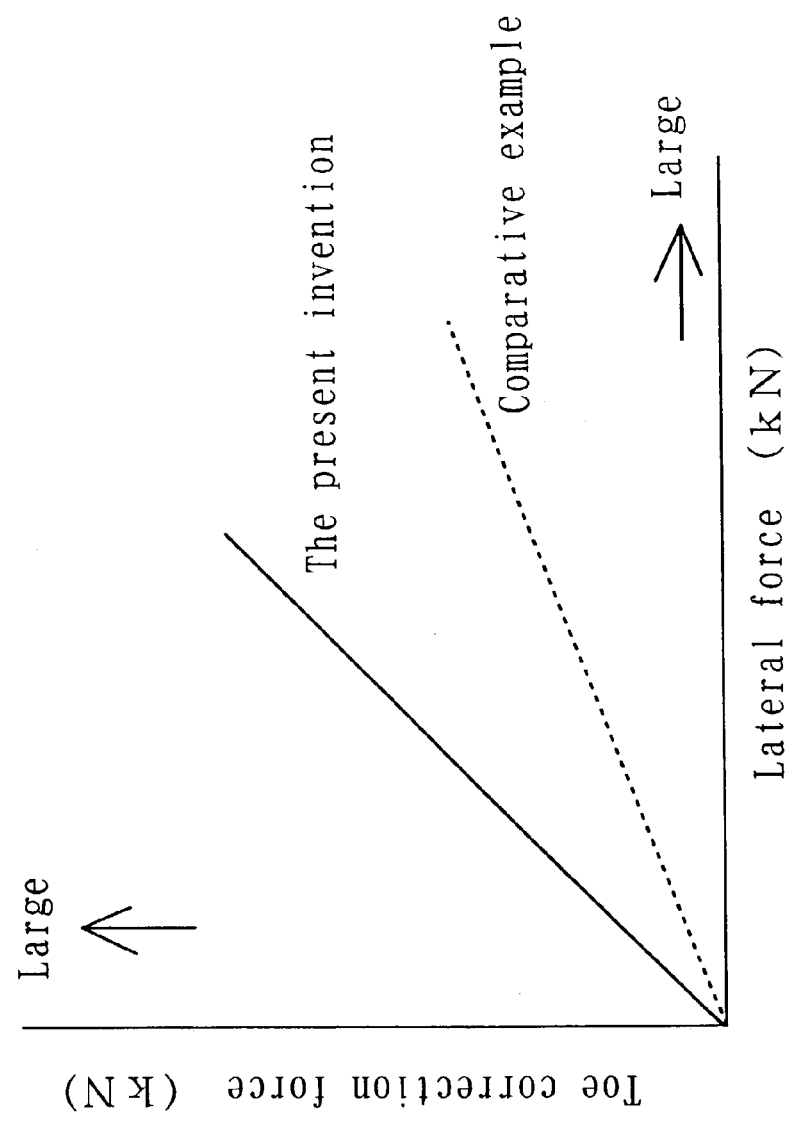
FIG. 11 is a graph showing the relationship between the input in the axial direction and the force of toe correction.

A second embodiment of the present invention constructed as a toe correction bushing for use in a car will be described with reference to the accompanying drawings. FIG. 7 is a cross-sectional view of the toe correction bushing corresponding to the line 7—7 of FIG. 8. FIG. 8 is a view of the toe correction bushing as seen from the arrow A of FIG. 7. FIG. 9 is a cross-sectional view of the toe correction bushing taken along the line 9—9 of FIG. 8. FIG. 10 is a view showing a theoretical action of toe correction and FIG. 11 is a view showing an effect of toe correction.

In FIGS. 7 through 9, this toe correction bushing 101 is provided with an inner cylinder 102, an outer cylinder 103, and an elastic body 104. An intermediate ring 105 is integrally embedded in the elastic body 104. The inner and outer cylinders 102, 103 are cylindrical members respectively made of a suitable rigid material such as a metal or a resin. In particular, the outer cylinder 103 is formed in a simple pipe shape.

The inner cylinder 102 is provided, on the outer periphery of its intermediate section, with a large diameter section 106 adapted to serve as an outward projecting section. An inclined plane 107 is formed on each end of the large diameter section 106 in the axial direction. The large diameter section 106 can be integrally formed with the inner cylinder 102 by casting, forging, shaving or the like, or can be formed as a separate cylindrical member to be integrally mounted on the inner cylinder 102. It is also possible to make the large diameter section 106 using a resin material.

The intermediate ring 105 is composed of a suitable metal or resin material. As is apparent from FIG. 8, the intermediate ring 105 is formed in a substantially semi-circular arc shape in a cross-section of the inner cylinder 102 in the direction perpendicular to the axis. It is provided with an intermediate ring main body 108 which runs parallel to the axis of the inner cylinder 102 in the axial cross-section. An inward projecting section 110 is integrally formed with one end of the intermediate ring main body 108 in the axial direction. The direction of the intermediate ring 105 parallel to the axis of the inner cylinder 102 is the longitudinal direction, and the direction parallel to its outer circumference is the lateral direction.

The inward projecting section 110 is integrally formed with the intermediate ring main body 108 to be comparatively rigid by casting, forging or shaping of a metal, or molding or shaping of a resin. However, the inward projecting section 110 can also be formed as a separate body using a metal or the like to be united by welding or the like for integration. In the case of the separate body, it can also be composed of a material with elasticity such as a rubber. The surface of the inward projecting section 110 facing the inclined plane 107 of the large diameter section 106 is made as an inclined plane 111 which is substantially parallel to the inclined plane 107.

The elastic body 104 is formed in such a manner that an elastic material such as a rubber is injected in a condition where the intermediate ring 105 is disposed between the inner cylinder 102 and the outer cylinder 103. The inner cylinder 102, the outer cylinder 103 and the intermediate ring 105 are combined together by the elastic body 104. In this case, the intermediate ring 105 is entirely embedded in the elastic body 104, and a thin elastic body layer is also formed between the intermediate ring main body 108 and the outer cylinder 103.

The extent of embedding is sufficient if at least the intermediate ring main body 108 is embedded in the elastic body 104 to be united together. In the case where the intermediate ring 105 is made of resin, part of the inward projecting section 110 and an end of the intermediate ring main body 108 can be exposed because there is no possibility of corrosion.

A1s shown in FIG. 7, the elastic body 104 covers the entire periphery of the inner cylinder 102 including the large diameter section 106. Part of the elastic body 104 forms an aperture plugging section 112 which fills for integration an aperture between the inclined plane 107 of the large diameter section 106 and the inclined plane 111 of the inward projecting section 110 which are located with some distance.

A recess 113 is formed in part of the elastic body 104 between the intermediate ring main body 108 and the large diameter section 106. The recess 113 is an example of a recessed section of the present invention. The recess 113 reaches near to the aperture plugging section 112 passing through the outer periphery of the large diameter section 106 in a radial direction from the opposite side of the inward projecting section 110 with respect to the inner cylinder in a cross-section of the inner cylinder 102 in the axial direction. The recess 113 is made open on the opposite side of the inward projecting section 110.

However, as shown in FIG. 9, in a section where the intermediate ring 105 is not integrated, the large diameter section 106 of the inner cylinder 102 and the outer cylinder 103 are connected together at a central position by a bridge section 114. Formed on each side of the bridge 114 in the axial direction is a recessed section 115 designed to become depressed toward the central side in the axial direction (see FIG. 9).

A pair of intermediate rings 105 is provided relative to the axis of the inner cylinder 102 and as shown in FIG. 7, these rings 105 are arranged in opposition. As a result, in a condition shown in the figure, the upper and lower intermediate rings 105 are provided symmetrical with respect to an intermediate point O of the inner cylinder 102 in the axial direction. In cross-section (i.e., FIG. 7) in the axial direction passing a pair of inward projecting sections 110, when connecting the intermediate ring main body 108, the intermediate point O in the axial direction, and the intermediate ring main body 108 with one another, a substantially Z shape is formed as a whole.

The outer peripheral height of the large diameter section 106 and the end height of the inward projecting section 110 are set to be almost the same in the axial direction of the inner cylinder 102, or are set to be slightly different in the axial direction. It is desirable that the aperture plugging section 112 be greatly compressed in the case of relative movement of the inner cylinder 102 and the outer cylinder 103 in the axial direction.

When assembling the toe correction bushing 101, the inner cylinder 102 is first inserted into the outer cylinder 103. The pair of intermediate rings 105 is reversed, then each ring 105 is inserted between the inner cylinder 102 and the outer cylinder 103, from opposite sides. Each inward projecting section 110 is situated on the opposite side in the axial direction relative to the large diameter section 106 formed in the central position of the inner cylinder 102. It is possible to easily produce the toe correction bushing 101 by injecting the elastic body 104 in this condition. Since each intermediate ring 105 is provided at one end thereof with the inward projecting section 110, it is possible to form the recess 113 which is opened to the other end.

In FIG. 7, reference numeral 109 is an axial hole formed through the inner cylinder 102 in the axial direction. A bolt 117 is inserted into the axial hole 109 and the inner cylinder 102 is secured to a U-shaped bracket 116 on a body side using a nut 118. The outer cylinder 103 is press-fitted into one end of a suspension arm 119.

An operation of the present embodiment will now be explained. When an external force is applied via the suspension arm 119 on the outer cylinder 103, for example, on the left side of FIG. 7 as a lateral force F in the axial direction, the outer cylinder 103 is driven to move on the left side in the axial direction along with the intermediate ring 105. However, the spring of the toe correction bushing 101 has been changed to a spring with directional properties of which the level is strong in the axial direction thanks to the existence of the intermediate ring 105. In this manner, the aperture plugging section 112 is compressed between the inclined plane 107 of the large diameter section 106 and the inclined plane 111 of the inward projecting section 110 facing the inclined plane 107 by the input F in the axial direction, wherein the movement of the intermediate ring 105 and the outer cylinder 103 in the axial direction is controlled. The counterforce by the compressed aperture plugging section 112 acts on the inclined plane 111 of the inward projecting section 110 in the substantially vertical direction. As a result, the intermediate ring 105 and the outer cylinder 103 are displaced to the front side (i.e., to the upper side of the figure) in the direction perpendicular to the axis and the central side of the inner cylinder 102. This displacement becomes large in accordance with the increment of the spring constant by the intermediate ring 105 for the same level of the input in the axial direction and makes the amount of displacement in the direction perpendicular to the axis sufficiently large. At the same time, the recession 113 accelerates the displacement in the direction perpendicular to the axis. With this displacement, the toe correction condition shown in FIG. 10 is realized.

FIG. 11 is a graph showing the toe correction characteristics obtained by the present embodiment along with a comparative example. The comparative example is provided, at the end of the outer cylinder, with an inclined section substantially parallel to the inclined section of the large diameter section 106 by omitting the intermediate ring. The thickness of the elastic body, the level of the spring constant, the inclination of each inclined section, and the aperture plugging section 112 between these inclined sections are constructed the same as in the present embodiment.

In the comparative example constructed above and the present embodiment, the input is applied in the axial direction in the same manner as above and the amount of displacement in the direction perpendicular to the axis generating on the outer cylinder is measured (see FIG. 11). It is apparent from this graph that the present embodiment provided with the intermediate ring can generate larger toe correction force (the vertical axis) for the input of the same level in the axial direction (the horizontal axis) than the comparative example and remarkable toe correction characteristics can be realized.

The characteristics of this toe correction motion can be freely changed by changing the angle of slope of each inclined plane 107, 111 of the large diameter section 106, which is the outward projecting section, and the inward projecting section 110, or the spring constant of the elastic body 104. In the case where a material with high elasticity such as a rubber is selected for the inward projecting section 110, the characteristics can also be freely adjusted by changing the elasticity of the material.

Further, in FIG. 7, the intermediate ring 105 is provided in pairs on the upper and lower sides of the figure relative to the inner cylinder 102. Since the inward projecting section 110, the inclined plane 107 and the recess 113 are symmetrically provided with respect to the intermediate point O in the axial direction, respectively, if the outer cylinder 103 is driven to move in the direction opposite to the axis of the inner cylinder 102 (i.e., to the right), a force in the reverse direction is generated by the inward projecting section 110, the large diameter section 106, and the aperture plugging section 112 which are located on the lower side of the figure to displace in reverse (i.e., to the lower side of the figure) which is the direction perpendicular to the axis.

Accordingly, in the same toe correction bushing 101, it is possible to realize the toe correction for either input in the axial direction. Further, when the toe correction bushing 101 is symmetrically disposed on the right and left sides of the body, the same bushing can be reversed. Accordingly, it is possible to use the same one in common for both sides and to reduce the number of parts.

A toe correction action of the present embodiment is theoretically shown in FIG. 10. The suspension mechanism of this car is constructed as follows. A pair of right wheels 130R, a pair of left wheels 130L, which are disposed on the right and left sides of a body are connected to the body via right and left toe correction bushings 131R, 131L and the right and left suspension arms 132R, 132L. A cross member 133 is provided to connect the right and left suspension arms 132R and 132L.

In the present figure, the mechanism shown in FIG. 7 is placed on the right side of the body. The toe correction bushing 1 of FIG. 7 corresponds to the right toe correction bushing 131R, and the suspension arm 119 corresponds to the right suspension arm 132R of the figure, respectively. These are symmetrically used on the left side of the body, and the left toe correction bushing 131L can be used by reversing the toe correction bushing 101 shown in FIG. 7 right and left.

In this suspension mechanism, for example, when turning to the left, the right toe correction bushing 131R receiving the lateral force F displaces a bearing point Q of the left suspension arm 132R to Q' toward the front of the body and inward. Wit this displacement, the right wheel 130R, which becomes an outer wheel, tilts to the left side having the rotation center to provide the toe-in.

As a result, the left suspension arm 132L which is integrally connected to the right suspension arm 132R by the cross member 133 also tilts to the left side to displace a bearing point P to P' toward the rear of the body and inward. Thus, a toe-in tendency is realized to perform the toe correction motion. When turning to the right, the above-mentioned operation is reversed.

According to the present embodiment, since the toe correction bushing 101 is provided with the intermediate ring 105 for realizing the displacement in the direction perpendicular to the axis, the spring constant for the elastic body 104 itself is not so increased, but the spring constant for the displacement in the axial direction can be increased by the intermediate ring 105. Namely, in the present embodiment, the spring constant in the right and left directions, which are the front and rear directions and axial direction when mounted on the body, is increased by the intermediate ring 105, and the spring constant in the vertical direction which is the other direction is not so increased.

In this manner, the directional properties can be given to the spring, and it is not only possible to realize a sufficient amount of displacement in the direction perpendicular to the axis (i.e., the front and rear direction) for the input in the axial direction, but also to provide a low spring constant for the vertical direction so as to maintain good riding quality. Since it is not always necessary to locally provide the outer cylinder with an inclined construction and the like, a simple shape can be realized and the outer shape of the entire device can also be made compact.

Further, the inner cylinder 102 is provided with the large diameter section 106 having the inclined plane 107 facing and with some distance from the inclined plane 111 of the inward projecting section 110 at an interval in the axial direction of the inner cylinder 102 and the aperture plugging section 112 which is part of the elastic body 104 is provided between the inclined planes 107 and 111. Accordingly, by compressing the aperture plugging section 112 between the inclined planes 107 and 111 by the input in the axial direction, it is possible to generate a stable and sufficient level of counterforce to make a large displacement in the direction perpendicular to the axis.

The inward projecting section 110 is provided only on one end of the intermediate ring 105 in the longitudinal direction. The intermediate ring is situated on a substantially concentric circle relative to the inner cylinder 102 and the outer cylinder 103 and has substantially a semi-circular arc shape which bends in the circumferential direction. The intermediate ring 105 is provided in pairs and reversed to be inserted between the inner and outer cylinder 102, 103 from the opposite direction. In this manner, each ring 105 can be inserted substantially parallel to the inner cylinder 102 or the outer cylinder 103 and accurate positioning of the inward projecting section 110 can be realized.

The pair of intermediate rings 105 is disposed in the reverse direction, and each inward projection section 110 is provided to put the large diameter section 106, which is the outward projecting section formed in the central position of the inner cylinder 102, between each inward projection section 110. The inward projecting sections 110 are symmetrically provided right and left with respect to an intermediate point O of the inner cylinder 102 in the axial direction so that each inclined plane 111 is arranged near each inclined plane 107 on the right or left side of the opposite side of the axis to face each plane 107. Accordingly, even if the outer cylinder 103 is driven to move in either direction of the axis, it is possible to displace the outer cylinder 103 in the direction perpendicular to the axis.

Still further, in a cross-section of the inner cylinder 102 in the axial direction shown in FIG. 7, since the recess 113 is provided on the opposite side of the inward projecting section 110 relative to the inner cylinder 102, it is possible to accelerate the displacement by the intermediate ring 105 in the direction perpendicular to the axis. Further, if the recess 113 is symmetrically provided right and left with respect to the intermediate point O along with the inward projecting section 110, it is also possible to accelerate the displacement in the direction perpendicular to the axis for any input in the axial direction.

The inward projecting section 110 can be integrally formed with part of the intermediate ring 105, or only the inward projecting section 110 can be formed as a separate body in advance to be integrally mounted on the main body 108. In either case, the inward projecting section 110 can be easily realized.

Figure 12:
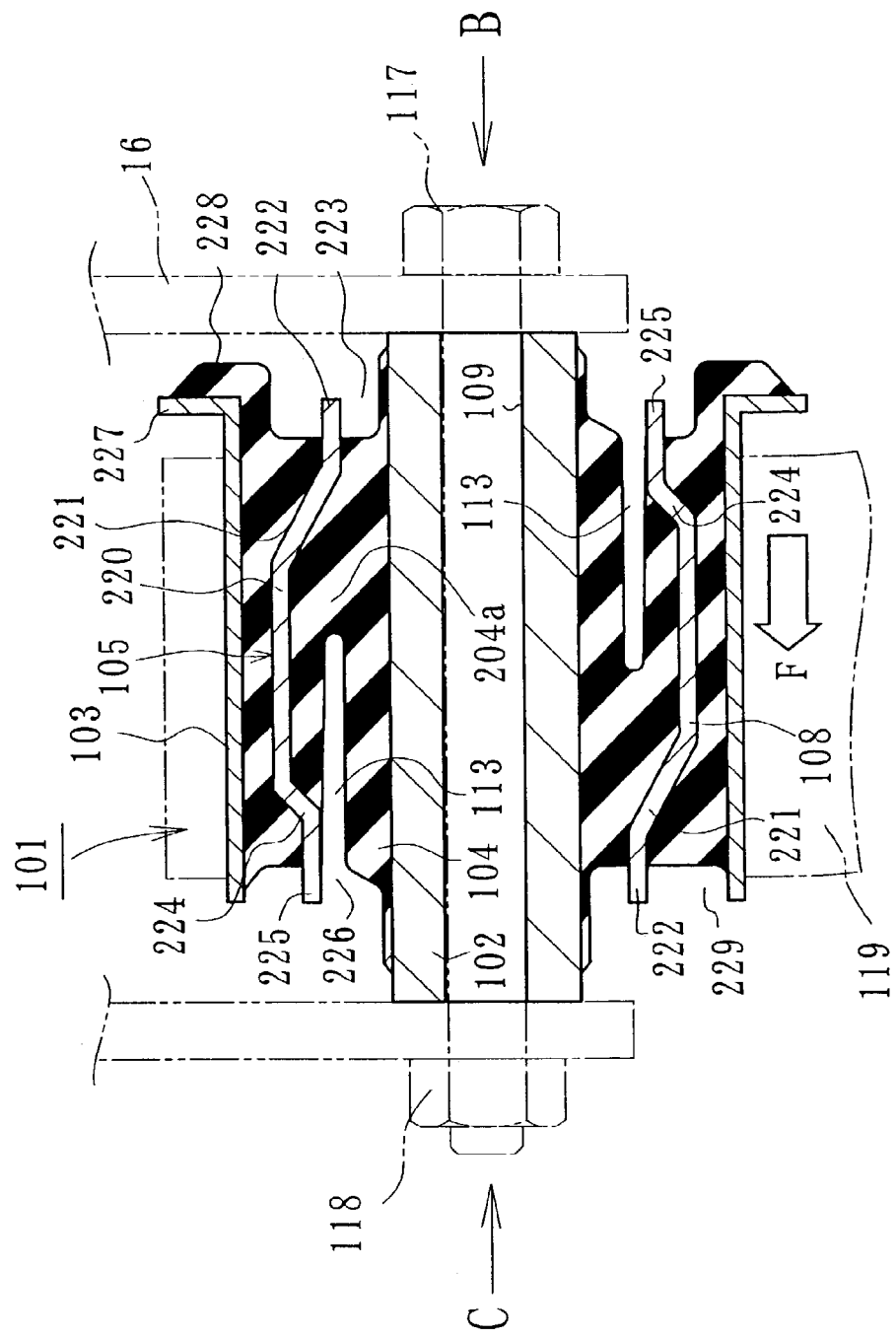
FIG. 12 is a cross-sectional view of a toe correction bushing according to a second embodiment taken along the line 12—12 of FIG. 14.
Figure 13:
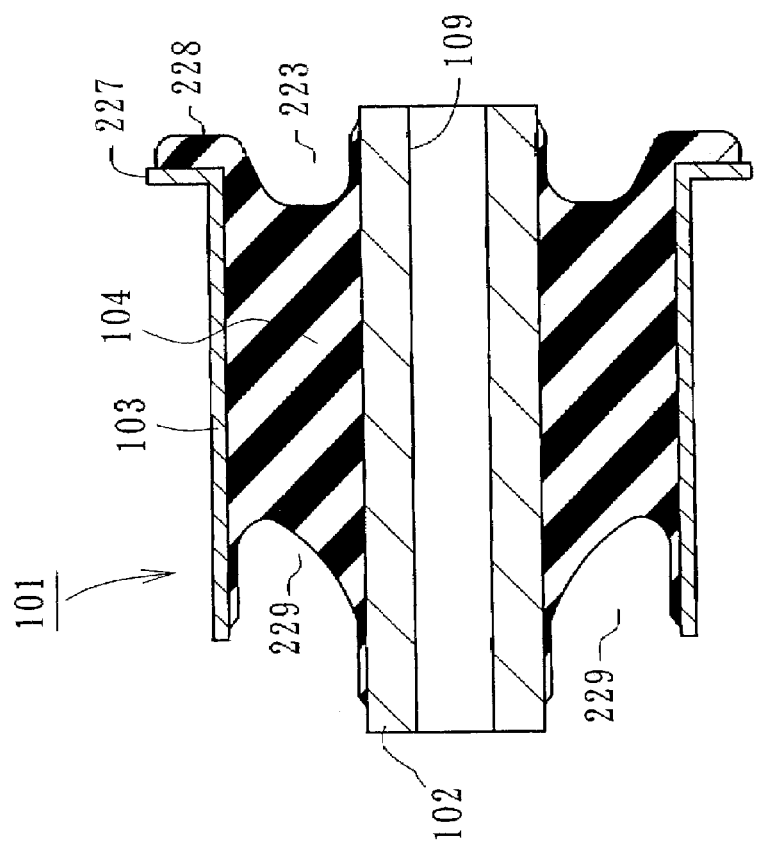
FIG. 13 is a cross-sectional view of the toe correction bushing taken along the line 13—13—of FIG. 14.
Figure 14:
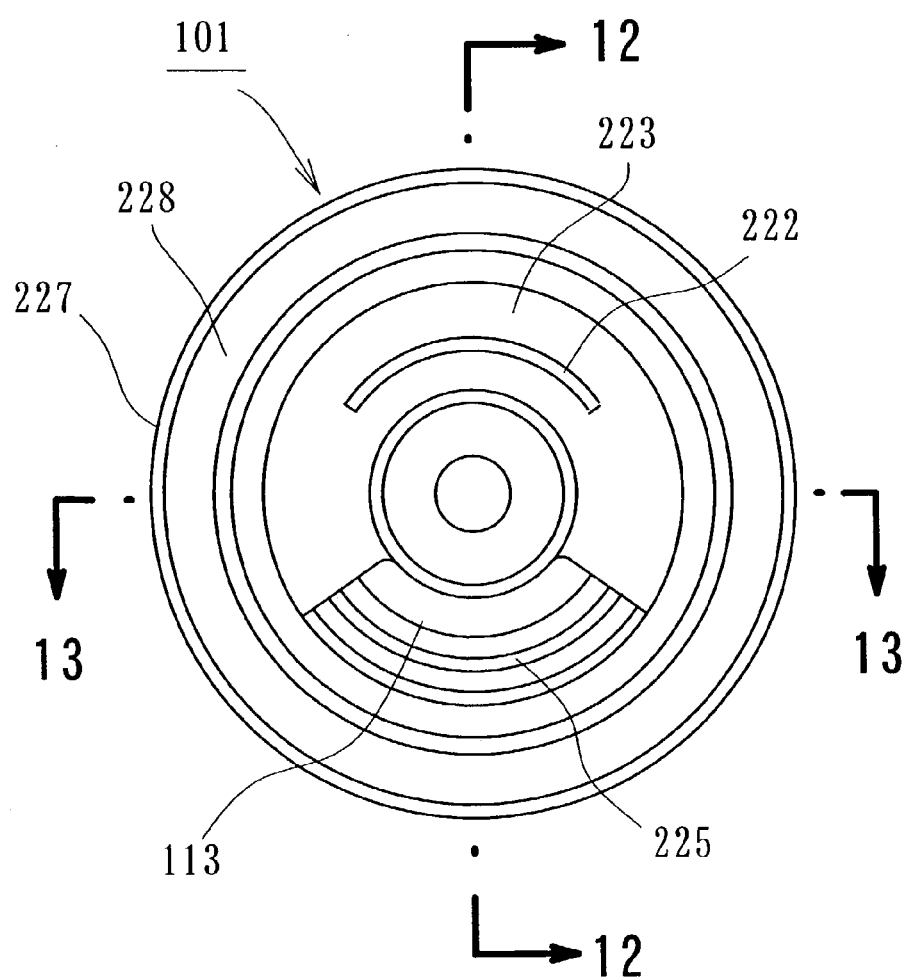
FIG. 14 is a view of the toe correction bushing as seen from the arrow B of FIG. 12.
Figure 15:
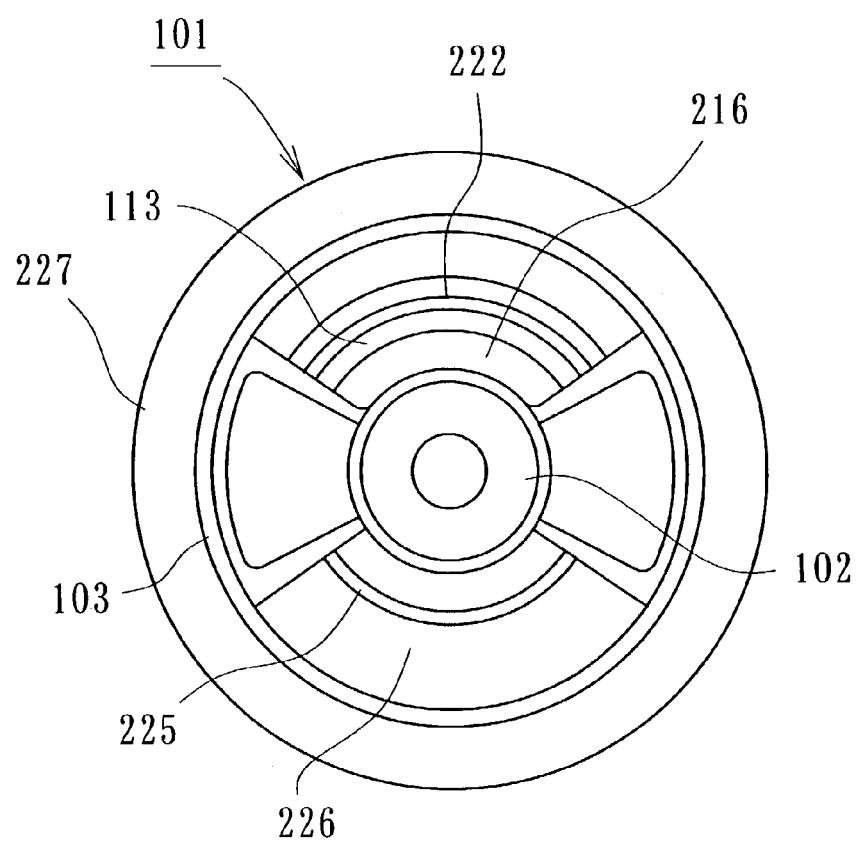
FIG. 15 is a view of the toe correction bushing as seen from the arrow C of FIG. 12.

A third embodiment will now be explained with reference to FIGS. 12 through 15. FIG. 12 is a cross-sectional view of a toe correction bushing taken along the line 12—12 of FIG. 14. FIG. 13 is a cross-sectional view of the toe correction bushing taken along the line 13—13 of FIG. 14. FIG. 14 is a view of the toe correction bushing as seen from the arrow B of FIG. 12 and FIG. 15 is a view of the toe correction bushing as seen from the arrow C of FIG. 12. A common reference numerals are used for the sections in common with the previous embodiment and repeated explanation is omitted.

In these figures, the toe correction bushing 101 is considerably different from the previous embodiment in that the inner cylinder 102 is not provided with a large diameter section, and in the construction of the intermediate ring 105. Namely, the inner cylinder 102 has a constant outer diameter in the overall length. However, the intermediate ring 105 has each end in the longitudinal direction drawn and the thickness is constant as a whole. The intermediate ring 105 is not provided with a section of which the thickness partially changes like the inward projecting section 110 in the previous embodiment.

In a cross-section (FIG. 12) of the inner cylinder 102 in the axial direction, the intermediate ring 105 is provided in pairs on the upper and lower sides of the inner cylinder 102. Referring to the intermediate ring 105 on the upper side, a intermediate ring main body 108 parallel to the axis is provided. Provided on the right side of the intermediate ring main body 108 in the figure is a long inclined section 221 which tapers toward the end. A small diameter step 222 is formed at the end of the intermediate ring main body 108 to be parallel to the axis. The height of the small diameter step 222 is almost the same as the recess 113 provided on the left side of the figure. The end of the small diameter step 222 projects within a recessed section 223 provided on the right end of the elastic body 104 and projects to the substantially same extent as the position of a flange 227 of the outer cylinder 103.

Provided also on the left side of the intermediate main ring body 108 in the figure is a small inclined plane 224 which also tapers toward the end, and a small diameter step 225 formed at the end to be parallel to the axis. The small diameter step 225 faces the recess 113 formed on the left side of the figure, wherein part of the small diameter step 225 is exposed to be flush with the inner surface of the recess 113 on its inner surface side. The end of the small diameter step 225 projects within a recessed section 226 provided on the left end of the elastic body 104 and projects to substantially the same extent as the left end of the outer cylinder 103. The small inclined plane 224 is made shorter than the long inclined plane 221 because it is formed between the recess 113 and the intermediate ring main body 108.

The intermediate ring 105 disposed on the lower side of the inner cylinder 102 and the upper intermediate ring 105 are symmetrically provided with respect to an intermediate point O in the axial direction. The recess 113 is also provided in the same manner. Accordingly, the long inclined plane 221 is provided on the left side of the figure and the small diameter step 222 projects within a recessed section 229 formed on the left side of the elastic body 104. The recessed section 229 is separately provided from the recessed section 226 (see FIG. 15). The small inclined plane 224 is provided on the right side of the figure and the small diameter step 225 projects within the recessed section 223 (see FIG. 14). The relationship between the small diameter steps 222, 225 and the recession 113 are the same as the upper side of the figure.

These upper and lower intermediate rings 105, 105 are curved in a semicircular arc shape respectively as shown in FIGS. 14, 15 in the width direction and each ring 105 is continuously formed to have the same thickness in overall length by pressing a metal plate or injection-molding a resin material into a predetermined shape. In the case where the intermediate ring 105 is made of the resin, a corrosion prevention treatment for the exposed section of the small diameter sections 222, 225 is not required. A component or construction material and a method of production can be arbitrarily determined. FIG. 13 shows a case where the intermediate ring 105 is not provided, wherein the inner cylinder 102 and the outer cylinder 103 extend parallel, and the elastic body 104 connecting the two cylinders 102, 103 is formed substantially solid and uniform except for the recessed sections 223, 229 on each end in the longitudinal direction and a stopper 228.

An operation of the present embodiment will be explained. In FIG. 12, when a lateral force F moving to the left of the figure in the case of turning to the left is applied to the outer cylinder 3, the intermediate ring 105 on the upper side of the figure is driven to move in the left direction along with the outer cylinder 103, but the spring constant of the toe correction bushing 101 in the axial direction has been increased by the existence of the intermediate ring 105. Accordingly, when a main compressing section 204a of the elastic body 104 provided between the long inclined plane 221 and the recess 113 is compressed, the force compressing the main compressing section 204a is increased and as a result, a large compression counterforce is generated to produce the force for displacing the long inclined plane 11 to the front side of the car body which is the direction perpendicular to the axis, wherein the same effective toe-in motion as seen in the previous embodiment can be obtained.

Referring to the lower intermediate ring 105, the long inclined plane 221 acts to pull the main compressing section 204a and the small inclined plane 224 acts to compress the outer side of the recess 113. However, since the part of outer side of the recess 113 is easily deformed toward the inside of the recess 113, such a counterforce as seen on the upper side of the figure is not produced. However, it is remarkable that the recess 113 rather acts to accelerate the displacement in the direction perpendicular to the axis generated on the upper side of the figure.

On the other hand, when turning to the right, the intermediate ring 105 on the lower side of the figure acts, on the contrary, to displace in the direction perpendicular to the axis (i.e., in reverse). Although not shown in the figure, in the case of the toe correction bushing provided in the direction opposite to FIG. 12 on the opposite side of the body, the same displacement in the direction perpendicular to the axis (i.e., forward) as the turning to the left in FIG. 12 is produced when turning to the right.

According to the present embodiment, it is possible to obtain sufficient toe correction force by simply providing the long inclined plane 221 on the intermediate ring 105 and providing the recess 113 on the opposite side relative to the axis of the inner cylinder 102. In this manner, it is possible to extremely simplify the construction and realize easy production.

It is to be noted that the present invention is not limited to the embodiments described above, but can be varied or applied in various manners within the scope of the principle of the same invention. For example, the inclined section in the displacement control means can be simply replaced by that having a surface perpendicular to the direction of the axis. Further, the recess 113 can be modified to have the recessed sections with various constructions. The inner cylinder 102 can also be connected to the suspension arm 119 by securing the outer cylinder to the body side. It is apparent that the present invention can also be applied to the other antivibration devices, which is used for changing the input in the axial direction to the displacement in the direction perpendicular to the axis, irrespective of the toe correction bushing.

What is claimed is:

1. An antivibration device comprising:
an inner cylinder;
an outer cylinder disposed outside the inner cylinder for engagement, the outer cylinder having a cylindrical part and a cone-shaped part, the cone-shaped part extending from the cylindrical part at an axial end of the outer cylinder;
an elastic body provided between the two cylinders, the elastic body being formed with a recess on an outer side of the inner cylinder; and
a stopper member adapted to control axial movement of one of the two cylinders when receiving an external force and displacing it in a direction perpendicular to the axis,
wherein the stopper member is separately provided from the two cylinders and the elastic body and secured to one axial end of the inner cylinder,
wherein the inner cylinder is disposed between a circular plate section of the stopper member at the one axial end thereof, and a U-shaped bracket at an opposite axial end thereof,
and wherein the inner cylinder includes a press-fitting section formed inside one end thereof for accommodating a boss of the stopper member.

2. The antivibration device according to claim 1, wherein the cone-shaped part at the axial end of the outer cylinder is an outwardly opening inclined section, and the stopper member is provided with a stopper projection adapted to engage an inner space of the inclined section.

3. The antivibration device according to claim 1, wherein the inner cylinder includes two axial ends extending beyond axial ends of the outer cylinder.

4. The antivibration device according to claim 2, wherein the stopper projection projects into the cone-shaped part of the outer cylinder.

5. The antivibration device according to claim 2, wherein an inclined elastic layer is provided between the stopper projection and the cone-shaped part of the outer cylinder.

6. The antivibration device according to claim 1, wherein a stopper projection of the stopper member projects into the recess of the elastic body are on the outer side of the inner cylinder.

7. The antivibration device according to claim 1, wherein the press-fitting section in the inner cylinder for accommodating the boss of the stopper member overlaps the cone-shaped part of the outer cylinder, and does not overlap the cylindrical part of the outer cylinder.

8. An antivibration device comprising:
an inner cylinder;
an outer cylinder disposed outside the inner cylinder for engagement;
an elastic body provided between the two cylinders, the elastic body having a recess formed on one side of the inner cylinder; and
a stopper member adapted to control an axial movement of one of the two cylinders when receiving an external force and displacing it in a direction perpendicular to the axis,
wherein the stopper member is separately provided from the two cylinders and the elastic body and secured to an axial end of the inner cylinder,
wherein a press-fitting section is formed inside one end of the inner cylinder for accommodating a boss of the stopper member.

9. The antivibration device according to claim 8, wherein the outer cylinder is provided at part of an axial end with an outwardly opening inclined section, and the stopper member is provided with a stopper projection adapted to engage an inner space of the inclined section.

10. The antivibration device according to claim 8, wherein the through hole in the elastic body opens toward both axial ends of the elastic body.

11. The antivibration device according to claim 8, wherein the recess of the elastic body opens toward an axial end of the elastic body opposite to the stopper member.

12. An antivibration device comprising:
an inner cylinder;
an outer cylinder disposed outside the inner cylinder for engagement, the outer cylinder having a cylindrical part and a cone-shaped part;

an elastic body provided between the two cylinders; and a stopper member having a circular plate section adapted to control axial movement of one of the two cylinders when receiving an external force and displacing it in a direction perpendicular to the axis, wherein the cone-shaped part extends from the cylindrical part at an axial end of the outer cylinder and includes an outwardly opening inclined section at the axial end of the outer cylinder, and wherein the stopper member is separately provided from the two cylinders and the elastic body and secured to one axial end of the inner cylinder and includes a stopper projection adapted to engage an inner space of the inclined section, wherein the inner cylinder is disposed between the circular plate section of the stopper member at the one axial end thereof, and a U-shaped bracket at an opposite axial end thereof.

13. An antivibration device comprising:

an inner cylinder;

an outer cylinder disposed outside the inner cylinder for engagement, the outer cylinder having a cylindrical part and a cone-shaped part, the cone-shaped part extending from the cylindrical part at an axial end of the outer cylinder;

an elastic body provided between the two cylinders, the elastic body being formed with a recess on one side of the inner cylinder; and a stopper member adapted to control axial movement of one of the two cylinders when receiving an external force and displacing it in a direction perpendicular to the axis, wherein the stopper member is separately provided from the two cylinders and the elastic body and secured to one axial end of the inner cylinder, and wherein a press fitting section is formed inside one end of the inner cylinder for accommodating a boss of the stopper member.

14. The antivibration device according to claim 8, wherein the inner cylinder is disposed between a circular plate section of the stopper member at the one axial end thereof, and a U-shaped bracket at an opposite axial end thereof.

15. The antivibration device according to claim 13, wherein the inner cylinder is disposed between a circular plate section of the stopper member at the one axial end thereof, and a U-shaped bracket at an opposite axial end thereof.

* * * * *